Feb. 10. 1925.

A. J. FORTUNATI

DENTAL ATTACHMENT

Filed April 5, 1922

1,526,129

INVENTOR.
Alexander J. Fortunati,
BY
James F. Duhamel,
ATTORNEY.

Patented Feb. 10, 1925.

1,526,129

UNITED STATES PATENT OFFICE.

ALEXANDER J. FORTUNATI, OF BOSTON, MASSACHUSETTS.

DENTAL ATTACHMENT.

Application filed April 5, 1922. Serial No. 549,780.

*To all whom it may concern:*

Be it known that I, ALEXANDER J. FORTUNATI, a resident of Boston, Suffolk County, Massachusetts, and a citizen of the United States, have invented certain new and useful Improvements in Dental Attachments, of which the following is a specification.

This invention relates to dental clasp attachments and has for its object the securing of removable bridge work and partial clasp dentures to the abutting teeth so that the connection is flexible and yielding to accommodate itself to changes due to absorption of oral tissues which is always met with in partial dental work.

Where these dental connections are not made rigid nor cemented, the attached work will slowly settle into the tissues of the gum, and while the same at the time of insertion is normal in its relation to the natural teeth, it will settle into the tissues and become too short.

Again, if the dentures are provided with clasps, the latter are generally made to fit around the tooth that is tapering and it follows that with continual use and pressure the clasp is forced down on the taper, carrying the attached denture with it and beyond that part of the tooth it was intended to fit.

A rigid and inflexible clasp attachment in partial dentures has always been objectionable and it results in serious irritation to the gum above the clasped tooth, as also all the strain of mastication is transmitted to the tooth which is invariably loosened within a comparatively short time.

To overcome these objectionable features the present invention consists of two members, one telescoping within the other, and each secured to different elements of the dental work so they may be attached together but a certain amount of movement is permitted. These and other objects and details of the invention are more fully described in the following specification, set forth in the appended claims and shown in the drawings, wherein:

Figure 1:
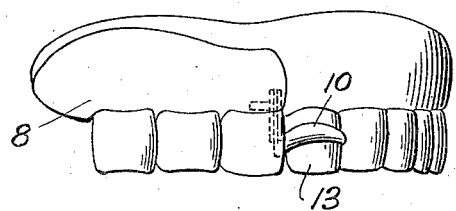
Fig. 1 is a side elevation of a denture showing the attachment partly in dotted lines.
Figure 2:
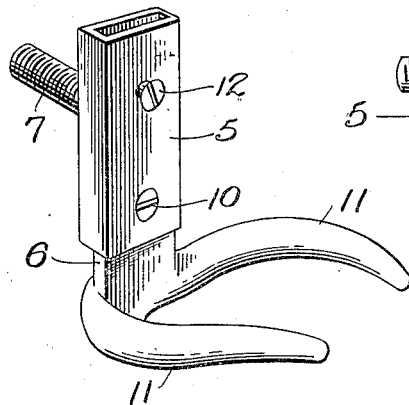
Fig. 2 is a perspective view of the same, enlarged.
Figure 4:
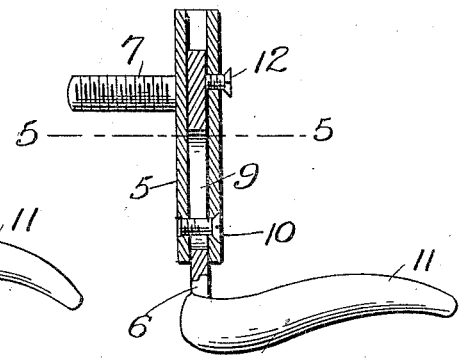
Fig. 4 is a vertical sectional view.
Figure 5:
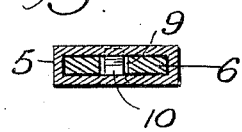
Fig. 5 is a cross sectional view on lines 5—5 of Fig. 4.
Figure 3:
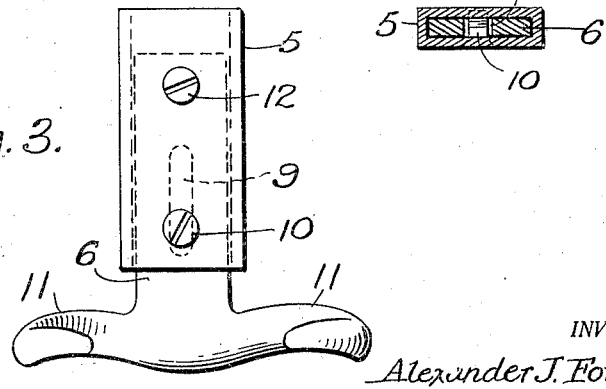
Fig. 3 is a side elevation of the same.

This attachment comprises the two members 5 and 6, the former being a tube rectangular in cross section and having a stud 7 projecting from its rear side and which is threaded or grooved to secure the member in the denture 8. An appropriate socket is made in the denture for the member 5 and it is rigidly secured therein by means of cement or solder, or vulcanized therein during the process of production.

The member 6 is a bar adapted to be secured within the member 5 and has a vertical slot 9 through which passes the pin or screw 10 that crosses the passageway in the member 5 and prevents the removal of the member 6.

The lower end of the latter member carries the clasp members 11 that are adapted to grasp the abutment tooth and secure the denture.

While the member 6 is slidable in the tube 5 it is held at any desired point by a set or clamping screw 12 until the clasp 11 is added and the device secured in the complete denture. The said screw 12 presses the slidable member against the back wall of the member 5 and when the denture is completed this screw may be removed and the slide left to move freely but be retained within the tube by the screw 10.

It is during the fitting of the clasp to the tooth that this temporary use is made of the screw 12 and it is loosened or removed after the attachment is completed.

Where the base of the denture 8 is of rubber, the attachment may be molded therein, but in case that the same is of precious metal, the attachment may be soldered in the socket already prepared.

As far as possible the attachment and its parts are to be made of non-corrosive metal or alloy and it is obvious that the parts may be otherwise arranged or modified without departing from the essential features above described or from the scope of the appended claims.

What I claim as new is:

1. In a dental attachment, the combination of a tubular containing member adapted to be carried by a section of dental work and having attaching means, an adjustable member adapted to be moved in the container and having a slot, a transverse pin through the container and slot of the adjustable member, a clasp on the adjustable member, and a clamping screw to hold the adjustable member in the containing member.

2. In a dental attachment, the combination of a tubular containing member adapted to be carried in a section of dental work, a laterally extending stud on the same, a slotted slide member adapted to be adusted in the containing member and having a clasp at its lower end, a removable cross pin in the container and passing through the slotted member, and a screw adapted to rigidly secure the members together.

3. In a dental attachment, the combination of a tubular member rectangular in cross section and adapted to be secured to a piece of bridge work, a slotted member adapted to securely fit and slide in the tubular member, a clasp for an abutment and carried by the slotted member, a screw in the tubular member and passing through the slot of the other member, and a clamping screw adapted to secure the two members together.

In testimony whereof I hereunto affix my signature.

ALEXANDER J. FORTUNATI.